United States Patent [19]

Mincy

[11] 4,300,309

[45] Nov. 17, 1981

[54] PLANT FEEDING DEVICE

[76] Inventor: Katherine S. Mincy, 5705 High Point Rd., Greensboro, N.C. 27407

[21] Appl. No.: 127,435

[22] Filed: Mar. 5, 1980

[51] Int. Cl.³ .............................................. A01G 29/00

[52] U.S. Cl. ...................................................... 47/48.5

[58] Field of Search ....................... 47/48.5, 79, 80, 81

[56] References Cited

U.S. PATENT DOCUMENTS

| | | | |
|---|---|---|---|
| 666,072 | 1/1901 | Sherman | 47/48.5 |
| 1,231,976 | 7/1917 | Weitzel | 47/81 X |
| 2,023,490 | 12/1935 | Richards | 47/48.5 |
| 2,072,165 | 3/1937 | Fow | 47/48.5 |
| 2,334,253 | 11/1943 | Davis | 221/67 |
| 2,595,782 | 5/1952 | Epstein | 47/48.5 |
| 2,747,332 | 5/1956 | Morehouse | 47/81 |
| 2,791,347 | 5/1957 | Boehm | 257/121 |
| 2,837,869 | 6/1958 | Chatten | 47/48.5 |
| 2,964,877 | 12/1960 | Gauding | 47/48.5 X |
| 3,069,807 | 12/1962 | Wall | 47/81 |
| 3,345,774 | 10/1967 | Delbuguet | 47/48.5 |
| 3,361,359 | 1/1968 | Chapin | 47/80 X |
| 3,754,352 | 8/1973 | Bates | 47/48.5 |
| 4,037,361 | 7/1977 | Murphy et al. | 47/48.5 |
| 4,089,133 | 5/1978 | Duncan | 47/48.5 |
| 4,115,951 | 9/1978 | Becker et al. | 47/48.5 |

FOREIGN PATENT DOCUMENTS

| | | | |
|---|---|---|---|
| 2908615 | 9/1979 | Fed. Rep. of Germany | 47/81 |
| 2382184 | 9/1978 | France | 47/48.5 |
| 851450 | 10/1960 | United Kingdom | 47/48.5 |

*Primary Examiner*—James R. Feyrer

[57] ABSTRACT

A plant feeding device is presented herein which includes a reservoir for liquids having attached thereto and in fluid communication with a porous soil penetrating member. The soil penetrating member is detachably affixed to the reservoir so that various sizes of reservoirs can be employed depending upon the requirement of the user.

2 Claims, 6 Drawing Figures

16

22

15

PLANT FEEDING DEVICE

BACKGROUND AND OBJECTIVES OF THE INVENTION

Plant feeding and watering devices have long been used and certain prior art designs employ liquid reservoirs which will drain at a suitable rate to insure feeding of the plant over a prolonged period of time. However, prior art devices have certain limitations which make them particularly difficult to regulate in certain instances and it is an objective of the present invention to provide a plant feeding device having a flow control means to better the plant treatment.

It is another objective of the present invention to provide a plant feeding device which includes a liquid reservoir that is detachably affixed to the soil penetrating member for quick and easy changing.

It is yet another objective of the present invention to provide a plant feeding device including a porous soil penetrating member to insure an even, uniform distribution of the liquid from the reservoir into the soil.

It is still yet another objective of the present invention to provide a plant feeding device having a pivotable soil penetrating member to facilitate insertion into the soil.

SUMMARY OF THE INVENTION AND DESCRIPTION OF THE DRAWINGS

The feeding device of the present invention consists of a refillable reservoir which is in fluid communication with a soil penetrating member. The fill cap on the reservoir includes one or more apertures and acts as a flow control means to regulate the release of the water or other liquids in the reservoir through the soil penetrating member and on into the plant soil. The reservoir may be detachable so that once the soil penetrating member is positioned in a potted plant or other location the reservoir can be removed and replaced with a larger or smaller reservoir as required. It has been found that a soil penetrating means constructed of a porous material such as sandstone allows a slow, even flow of the liquid into the surrounding soil. In order to allow the soil of a potted plant to be moistened equally from top to bottom the soil penetrating member includes a center passageway having a sleeve which has a longitudinal opening or slit throughout its length. This slit retards the liquid passage and insures even top to bottom liquid distribution.

Utilization of the feeding device is done by urging the soil penetrating member into the soil of a potted or other plant in close proximation to the root system. The reservoir cap is removed and the empty reservoir is filled with water or other liquids such as plant nutrients. The cap which acts as a flow control means is replaced and the liquid of the reservoir then slowly drains into the soil penetrating member for release into the surrounding soil. The reservoir can contain enough liquid to maintain the plant for a one to two week period depending upon its capacity at which time the user would then remove the cap and refill the reservoir without removing the feeding device at which time the plant feeding cycle would begin again.

For more details of the invention, turning now to the drawings,

FIG. 1 demonstrates a potted plant having two feeding devices of the present invention positioned therein;

Figure 1:
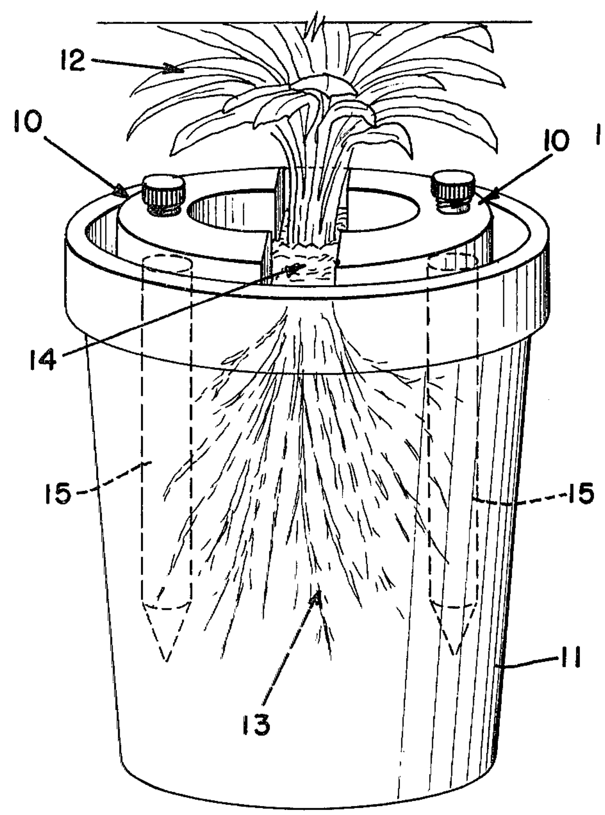

For a more detailed description of the invention, a pair of feeding devices 10 in FIG. 1 are shown positioned in a typical plant container 11. Plant 12 growing therein is nurtured through its root system 13 below the top of soil 14. Soil penetrating members 15 are shown in broken line configuration as they remain in close proximity to root system 13.

Figure 2:
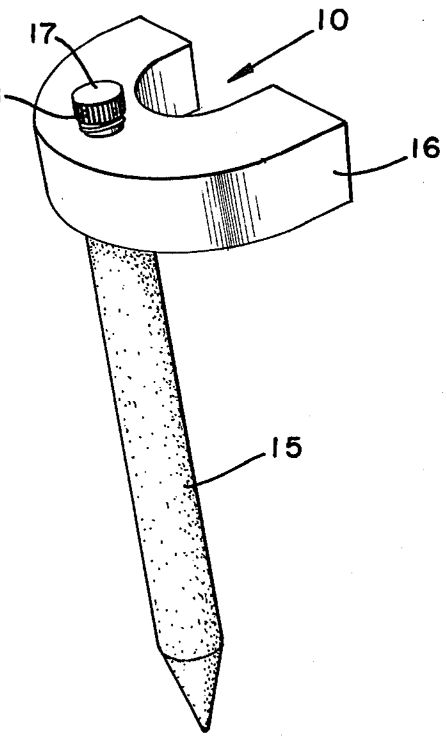
FIG. 2 is a perspective view of one of the feeding devices as shown in FIG. 1.

As shown in FIG. 2 soil penetrating member 15 is constructed from a porous material such as sandstone or otherwise to insure a smooth, even distribution of the liquid feeder solution received from liquid reservoir 16. Fill cap 17 is shown positioned above reservoir 16 and includes aperture 18 which allows air to enter the reservoir, thus fill cap 17 acts as a flow control means for the liquid in reservoir 16, and one or more apertures may be placed in cap 17 as needed to insure a proper air supply for drainage purposes.

Figure 3:
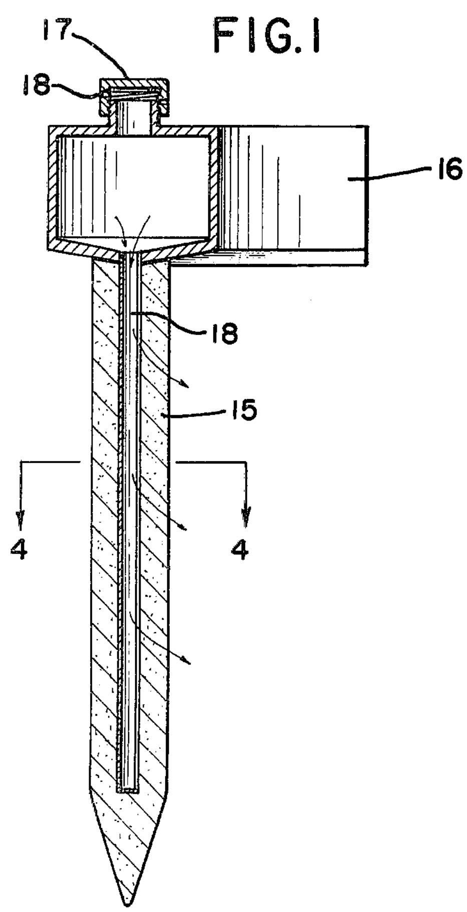
FIG. 3 is a cross-sectional view of the feeding device of FIG. 2.
Figure 4:
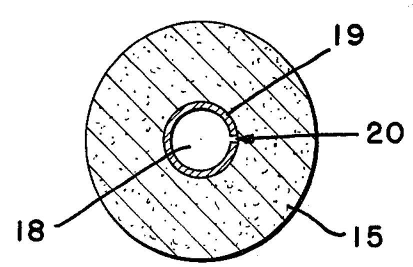
FIG. 4 is a cross-sectional view taken through lines 4—4 of FIG. 3.

In FIG. 3 passageway 18 is shown within the center of soil penetrating member 15 and passageway 18 is in fluid communication with the interior of reservoir 16 to receive liquids therefrom. Sleeve member 19 is shown within the passageway 18 in FIG. 4 and has been inserted to provide a more uniform distribution of the feeder solution from top to bottom of soil penetrating member 15. A slit or longitudinal opening 20 in sleeve member 19 allows only a small amount of fluid to exit the passageway 18 as sleeve 19 is made of plastic, metal or other materials which are impervious to the feeder solution.

Figure 5:
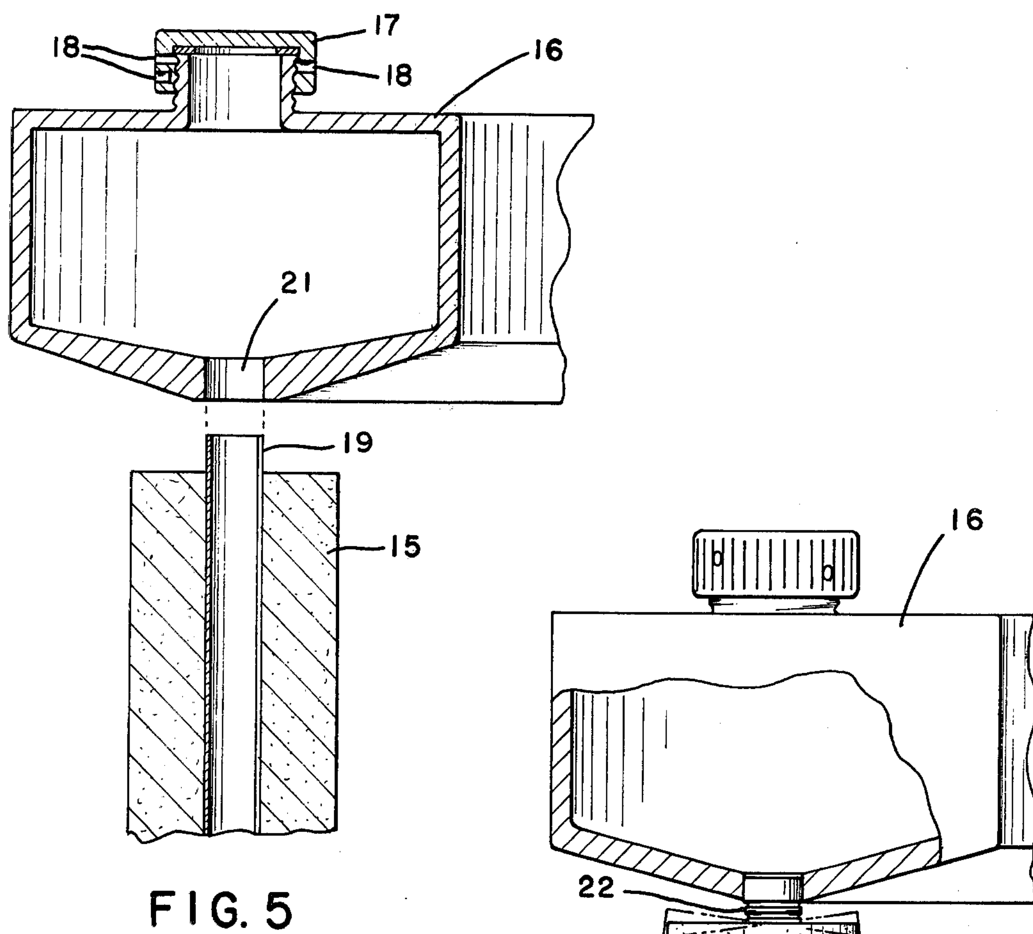
FIG. 5 is a cross-sectional view of the feeding device showing the detachability of the reservoir.

In FIG. 5 the detachability of soil penetrating member 15 is shown apart from reservoir 16. The detachable feature allows for a variety of sizes and shapes of reservoirs to be employed and allows a greater versatility in the utilization of feeding device 10 since users may want to experiment with different size reservoirs or may wish to move the plant feeding devices to different plants which require different amounts of feeder solutions.

During assembly, sleeve 19 is frictionally engaged in opening 21 along the bottom of reservoir 16 thereby forming a tight coupling and allowing fluid communication between reservoir 16 and soil penetrating member 15.

Figure 6:
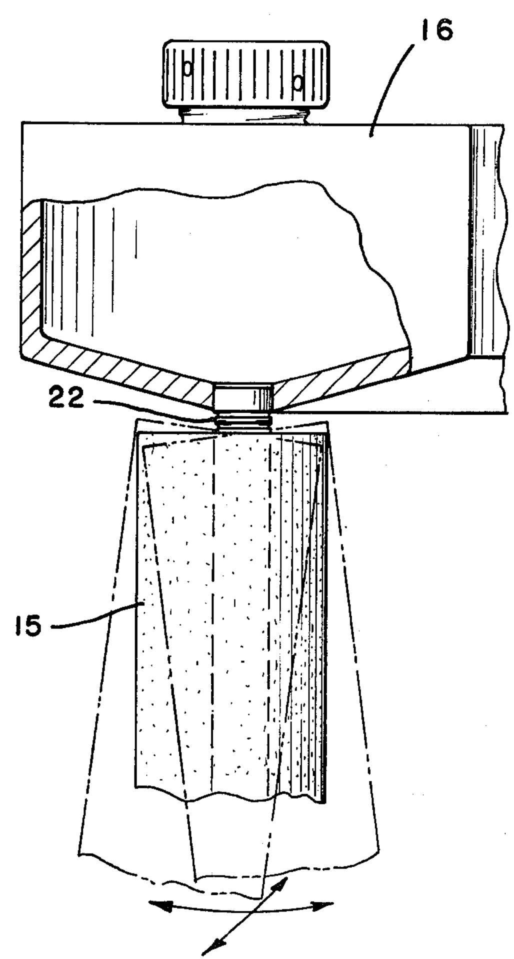
FIG. 6 demonstrates the pivotable feature of the soil penetrating member.

In the preferred embodiment of the present invention pivotable soil penetrating member 15 is presented as shown in FIG. 6 which allows member 15 to be positioned at a variety of angular configurations, shown in broken line notation, from reservoir 16. This pivotable action is useful and necessary in certain instances such as when the soil penetrating member must be disposed in an angular direction to avoid roots, rocks or other obstacles which may lie in its vertical path. The pivotable feature of soil penetrating member 15 can be accomplished by a flexible, corrugated joint 22 which may be formed as an integral part of the upper portion of passageway sleeve 19 or may be manufactured as a separate unit for insertion therein. Other pivotable connectors or joints may be used and may be made of metals or other suitable compositions. As further shown in FIG. 6 the pivoting action of soil penetrating member 15 may be in any and all directions relative to the reservoir 16.

The examples and illustrations shown herein are to demonstrate the certain characteristics of the invention and are not intended to limit its scope.

I claim:

1. A plant watering device comprising; a reservoir for placement on the soil proximate to a plant, said reservoir being replaceable and frictionally engageable with a pointed, cylindrical soil penetrating member, said penetrating member constructed of an outer porous material and having a center sleeve, said center sleeve formed of a liquid impervious material and having a longitudinal opening along its entire length, said penetrating member and said reservoir being interconnected by a joint which allows pivoting of the reservoir obliquely relative to said soil penetrating member whereby said penetrating member can be inserted into the soil at a desired angle to said reservoir and said reservoir can remain in a stationary position on the soil for allowing a controlled flow of liquid to pass from said reservoir through the longitudinal opening of the center sleeve and through the outer porous material and into the soil.

2. A plant watering device as claimed in claim 1 wherein said reservoir includes a flow control means.

* * * * *